United States Patent Office 3,427,442
Patented Feb. 11, 1969

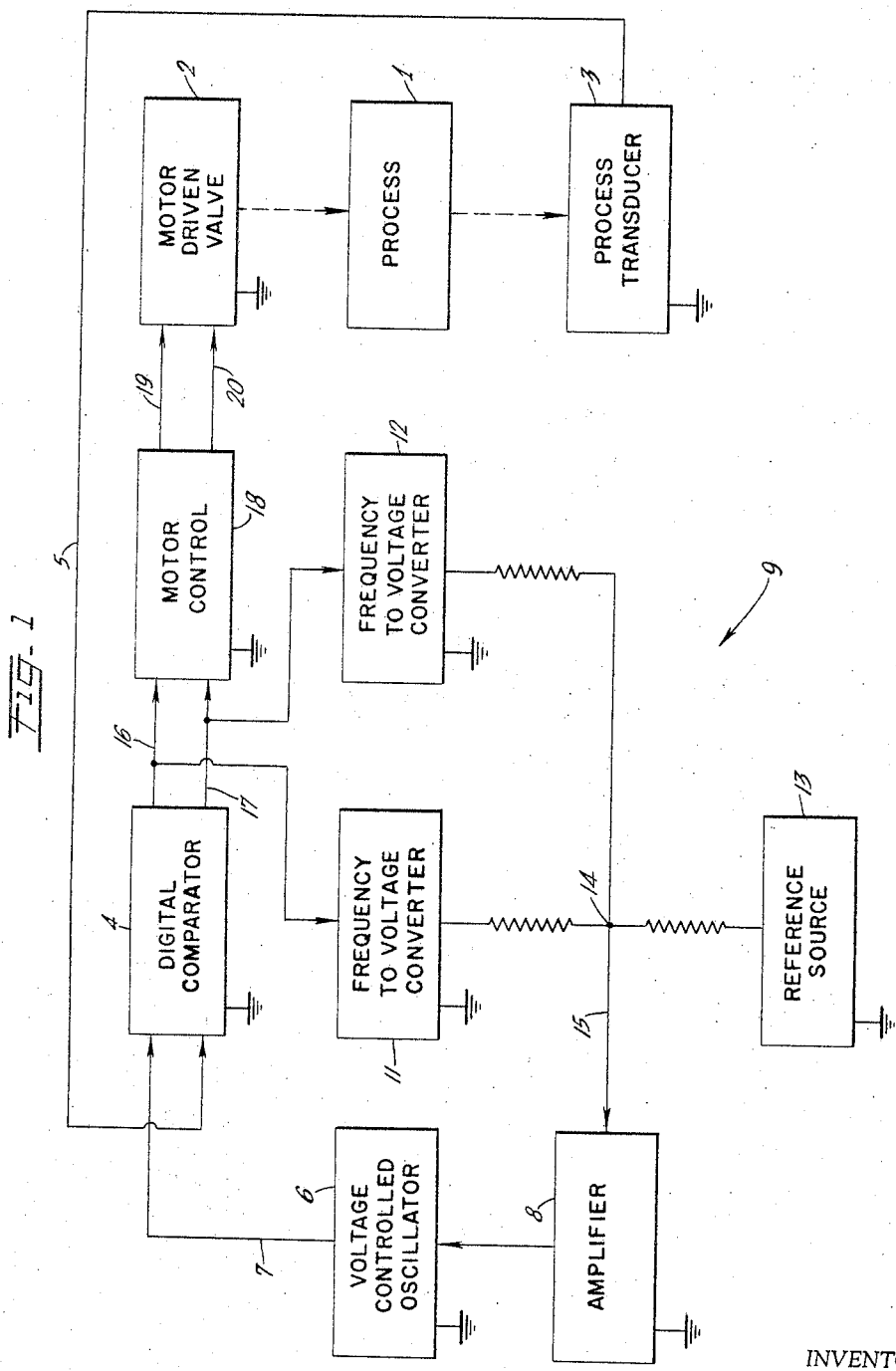

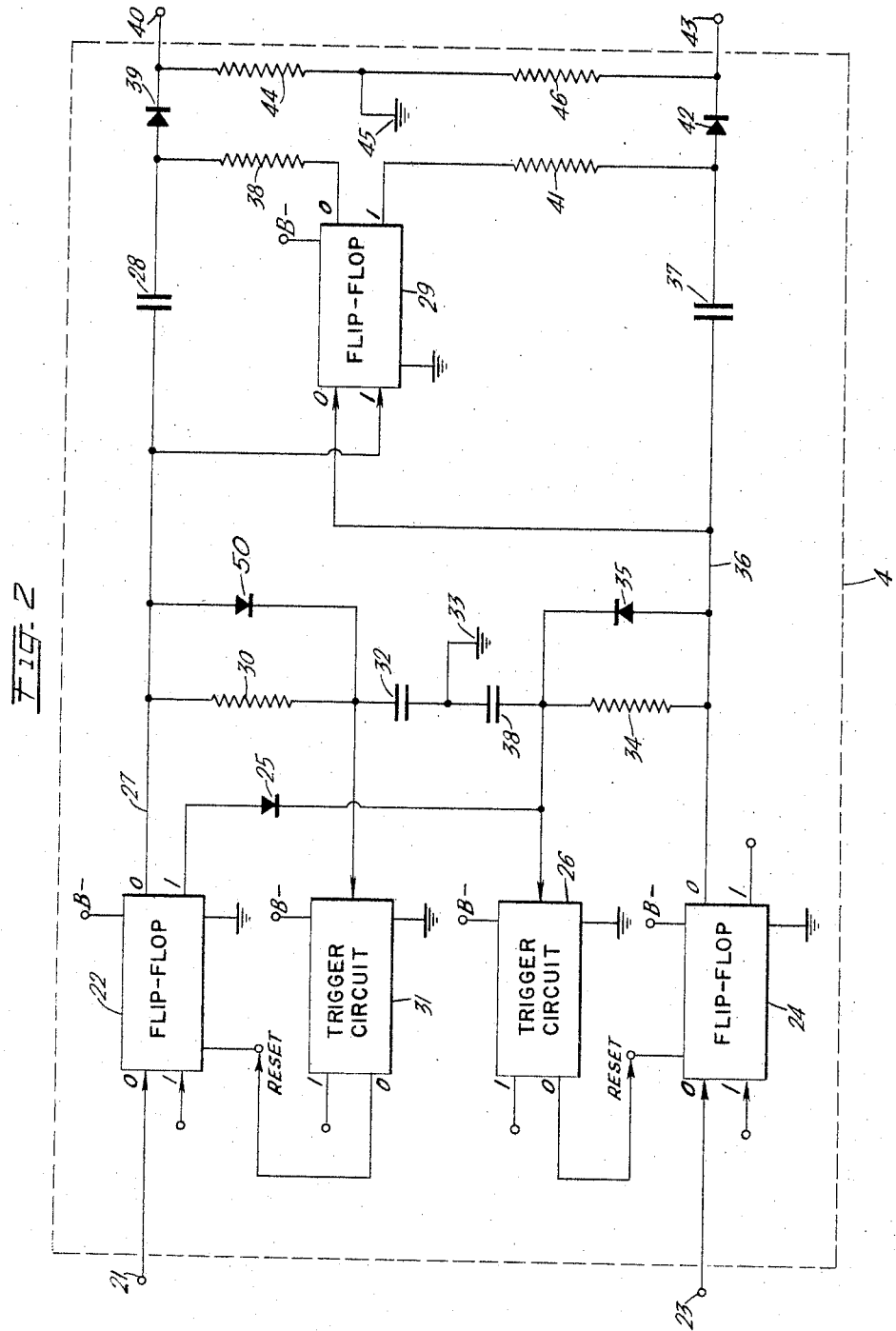

3,427,442
PROCESS CONTROL APPARATUS
Morton Sklaroff, Philadelphia, Pa., assignor to
Honeywell Inc., a corporation of Delaware
Filed Jan. 18, 1965, Ser. No. 426,019
U.S. Cl. 235—151.1      4 Claims
Int. Cl. G06f 15/46; G06g 7/48; G01r 23/14

ABSTRACT OF THE DISCLOSURE

A system utilizing digital techniques to control a flow in a process which corrects set-point deviations in either direction and stabilizes at the set-point level. Control is achieved by comparing a frequency signal representative of a set-point level with a frequency signal derived from the state of the controlled process. A deviation from the set-point level produces a frequency output signal which together with a reference source causes a voltage-controlled oscillator to provide the correction.

---

This invention relates to process control systems. More specifically, the present invention relates to digital control systems.

An object of the present invention is to provide an improved digital control system for direct and continuous control of an operating process.

Another object of the present invention is to provide an improved flow control system using digital error correcting techniques.

Still another object of the present invention is to provide an improved direct digital control system for a process for effecting a set-point control of the process by correcting set-point deviations in either direction and stabilizing at the set-point level.

A further object of the present invention is to provide an improved digital control system having a digital comparator for comparing digital input signals and providing a digital output signal representative of the difference in the compared signals and characterized by the direction of the sensed difference.

A still further object of the present invention is to provide a digital control system, as set forth herein, having a simplified operation and construction.

In accomplishing these and other objects, there has been provided, in accordance with the present invention, a digital control system for determining the effective status of a process control device in order to affect a process by correcting a set-point deviation of the control device. As illustrated, the system is used to control a flow in a process by comparing a frequency signal representative of a set-point level with a frequency signal derived from the state of the controlled process. A deviation from the set-point level is effective to produce a frequency output signal from the comparator representative of the frequency difference between the compared signals and on a respective comparator output line corresponding to the direction of the set-point deviation. A voltage-controlled oscillator is used to provide the set-point frequency in response to the combined effects of a reference source and a voltage signal representative of the frequency of the output signal from the comparator to provide a rapid correction for a large error and a decreasing rate of correction as the set-point level is approached with a stabilization at the desired level.

A better understanding of the present invention may be had when the following detailed specification is read in connection with the accompanying drawings, in which:

FIG. 1 is a block diagram of a digital control system embodying the present invention, and FIG. 2 is a schematic illustration of a novel digital signal comparator suitable for use with the system shown in FIG. 1.

Referring to FIG. 1 in more detail, there is shown a digital flow control system for controlling a flow in a process 1 by means of a driven valve 2. Typically, valve 2 may be driven by a suitable stepping motor. A process transducer 3 is arranged to sense the flow or some other variable in the process 1 and to produce a variable frequency output signal representative of the magnitude of the sensed variable. This output signal is applied to a digital comparator 4 along a line 5 to be compared with a set-point, or reference signal. The set-point signal is obtained from a voltage-controlled oscillator 6 along line 7. The oscillator 6 is controlled by an output signal from an amplifier 8. The input signal for the amplifier 8 is provided by a flow error control circuit 9. The control circuit 9 comprises a first digital, or frequency, to voltage converter 11, a second digital, or frequency, to voltage converter 12 and a reference signal source 13. The output signals from the first and second converters 11 and 12 and the source 13 are combined at a junction 14 and are applied along line 15 as an input signal to the amplifier 8. The input signals for the converters 11 and 12 are obtained from the comparator 4.

The comparator 4 is effective to compare the frequencies of the input signals on lines 5 and 7 and to produce a variable frequency output signal on one of two output lines 16 and 17 representative of the difference in the frequencies of the input signals applied to the comparator 4. A suitable circuit for the comparator 4 is shown in FIG. 2 and is described hereinafter. The output lines 16 and 17 are both connected to a motor control circuit 18. In addition the converters 11 and 12, respectively, are connected to separate ones of the output lines 16 and 17. The motor control circuit 18 is arranged to amplify the input signals supplied thereto via either of the lines 16 and 17 and to apply an amplified signal to the motorized valve 2 on a respective one of a pair of output lines 19 and 20. The signals on lines 19 and 20 are effective to drive the motorized valve 2 in a corresponding direction.

In operation, the system shown in FIG. 1 is operative to control a flow in the process 1 by selective control of the motorized valve 2. For example, in an initial state when the system is turned on, the output frequency from the oscillator 6 is determined by the signal from the reference source 13. Assuming the flow in the process 1 is to be increased, the comparator 4 is effective to produce an output signal which indicates that the frequency of the set-point level is greater than the frequency of the signal from the transducer 3. This output signal is arranged to be applied on line 16, hereinafter referred to as the "up" line 16. Conversely, a desired decrease in the flow would produce an output signal on line 17, referred to as the "down" line 17. The output signal on "up" line 16 is applied to the motor control 18 to produce a corresponding output signal on output line 19 to open the valve 2. Similarly, the output signal on "down" line 17 would produce a signal on line 20 to close the valve 2. These desired changes in the flow may result either from disturbances in the process 1 which upset the flow relative to the set-point level or as a result of a change from an old set-point level to a new set-point level. In either case, there is a frequency error signal produced by the comparator 4 on the appropriate one of the lines 16 and 17.

The output signal on "up" line 16 is, also, applied to the converter 11 where it is arranged to provide an output signal voltage. This output voltage is directly proportional to the input frequency but it is arranged to subtract from the voltage signal from the source 13. The resulting signal from the junction 14 is a lower magnitude signal than was formerly applied to the oscillator 6. This decrease in the oscillator input signal is effective to decrease the frequency of the output signal from the oscillator 6. The output signal from the comparator 4, accordingly, will decrease in frequency on the "up" line 16 to slow down the rate of opening of the valve 2. Meanwhile, the output signal from the transducer 3 has been increasing in frequency to also decrease the difference frequency of the output signal on the "up" line 16. The decrease in frequency of the signal on line 16 is effective to decrease the output signal from converter 11 and allow the output signal from the junction 14 to rise toward the reference signal from source 13 to increase the oscillator frequency. Since, the signal from transducer 3 continues to increase, the difference in compared signals continues to decrease and the flow is allowed to increase to the desired level. At the desired level, only the reference signal from source 13 is effective to determine the frequency of the oscillator 6 output signal. This frequency is equal to the frequency of the output signal from the transducer 3, and the signal on "up" line 16 is terminated.

If a corrective decrease in the flow is indicated by having the frequency of the transducer 3 output signal greater than the output signal from oscillator 6, the comparator 4 is arranged to produce a difference frequency signal on the "down" line 17. This output signal is applied to the motor control 18 to decrease the flow and to converter 12 to produce a directly proportional output signal. The output signal from comparator 12 is arranged to add to the signal from source 13. This incerase in the signal applied to the oscillator 6 is effetcive to increase the frequency of the oscillator output signal. The increase in the oscillator output signal is effective to decrease the difference signal on the "down" line 17 and to decrease the rate of decreasing the flow by the valve 2. Since the two input signals to the comparator 4 gradually approach each other, as in the case of an increase in the flow, the output signal from the comparator 4 decreases to a zero frequency level and the input signal to the amplifier 8 approaches the reference signal from the source 13. Thus, in either the case of a desired flow increase or a flow decrease, the apparatus of the present invention is arranged to allow the flow or process change to occur at an initial high rate and at a subsequently decreasing rate until the change is terminated at the set-point level. Accordingly, the process 1 is either stabilized at an old set-point level after a disturbance in either direction from the level or is changed to a new set-point level in accordance with a desired change from the old set-point level.

Referring now to FIG. 2, there is shown a digital comparator suitable for use as the comparator 4 shown in FIG. 1. A first input terminal 21 is connected to the "0" side of a first flip-flop 22. A second input terminal 23 is similarly connected to the "0" side of a second flip-flop 24. The "1" input sides of these flip-flops 22 and 24 are left unconnected. The "1" output side of the flip-flop 22 is connected to the anode electrode of a first diode 25. The cathode of diode 25 is connected to the input circuit of a first so-called Schmitt trigger circuit 26. The "0" output side of the trigger circuit 26 is connected to a "reset" circuit for the second flip-flop 24. The "0" output of the first flip-flop 22 is connected along line 27 to one side of a first coupling capacitor 28 and the "1" input side of a third flip-flop 29.

A first resistor 30 is connected between line 27 and the input circuit of a second Schmitt trigger circuit 31. A second diode 50 is connected across the resistor 30 with its anode electrode connected to line 27. A first trigger capacitor 32 is connected between the input circuit of the trigger circuit 31 and a ground point 33. The "0" output of the trigger circuit 31 is connected to the "reset" circuit of the first flip-flop 22. The "1" output of the trigger circuit 31 is not connected.

The "0" output side of the second flip-flop 24 is connected to the input circuit of the first trigger circuit 26 through a second resistor 34. The "1" output side of flip-flop 24 is not connected. A third diode 35 is connected across the resistor 34 with its anode electrode connected to a line 36. Line 36 is connected between the "0" output side of the second flip-flop 24 and one side of a second coupling capacitor 37. Line 36 is also connected to the "0" input side of the third flip-flop 29. A second trigger capacitor 38 is connected between the end of resistor 34 connected to trigger circuit 26 and the ground point 33.

The "0" output side of the third flip-flop 29 is connected through a resistor 38 to the anode electrode of a fourth diode 39 and the other side of capacitor 28. The cathode electrode of diode 39 is connected to a first output terminal 40. The "1" output side of flip-flop 29 is similarly connected through a resistor 41 to the anode of a fifth diode 42 and the other side of capacitor 37. Diode 42 has its cathode connected to a second output terminal 43. A first output resistor 44 is connected between the first output terminal 40 and a ground point 45 which may be a common point with ground point 33. A second output resistor 46 is connected between the second output terminal 43 and the ground point 45.

The circuit shown in FIG. 2 is effective to provide a frequency comparison between two applied frequencies and to produce a frequency error, or difference signal on an appropriate output line. For example, one onput line represents a greater frequency by a first signal relative to a second signal and the other output line represents the reverse condition of the compared input signals. Using the arrangement shown in FIG. 2, the first input signal; e.g., the output signal from the oscillator 6, is applied to the input terminal 23. The second input signal; e.g., the output signal from the transducer 3, is applied to the input terminal 21. The first output terminal 40 is arranged to produce an output signal when the frequency of the signal on input terminal 21 is greater than the frequency of the signal on input terminal 23. Conversely, the second output terminal 43 is arranged to produce an output signal when the frequency of the signal on terminal 23 is greater than the frequency of the signal on terminal 21. Additionally, the comparator circuit 4 shown in FIG. 1 is arranged to produce no output signal when the frequencies of the two input signals are equal.

For example, if the input frequencies are equal but not in phase, flip-flop 24 is arranged to be switched into a "0" state by the positive going side of the input signal on terminal 23. Thus, the "0" output side of flip-flop 24 exhibits a relatively negative signal and the "1" output side of flip-flop 24 exhibits a relatively positive signal. The first flip-flop 22 is arranged to be in a "1" state either as an initial setting or as a result of a previous cycle, as described hereinafter. Thus, the "0" output side of flip-flop 22 exhibits a relatively positive signal and the "1" output side of flip-flop 22 exhibits a relatively negative signal. Diode 25 is in a non-conductively biased condition by the signal at the "1" side of flip-flop 22 since the cathode of diode 25 is now at the same negative voltage from the non-conducting "0" output side of flip-flop 24 with respect to the anode of diode 25 connected to the "1" state of flip-flop 22. The non-conductive state of diode 25 allows the capacitor 38 to charge through resistor 34 until the stored voltage reaches the threshold voltage of the trigger circuit 26. The trigger circuit 26 is, then, energized to produce an output signal by changing from a "0" to "1" state which change is effective to produce an actuating signal for the "reset" circuit of flip-flop 24. This actuating signal resets flip-flop 24 to a "1" state. This change in the flip-flop 24 produces a positive going signal on line 36 which is applied to flip-flop 29. This signal on line 36 causes flip-flop 29 to assume a "0" state in its output circuit. Since the "1" side of flip-flop 29 is now at a positive potential, the anode of diode 42 is connected to a positive potential and diode 42 is conductively biased.

The signal applied to terminal 21 now changes in a positive direction to change the state of flip-flop 22 to a "0" state. This state of flip-flop 22 allows capacitor 32 to charge in a direction which approaches the threshold voltage of trigger circuit 31. When this threshold voltage is reached, trigger circuit 31 changes from "0" to a "1" state. At this time, a signal representing the change of state of trigger circuit 31 is applied to the reset circuit of flip-flop 22 to reset it to a "1" state. The change in flip-flop 22 to a "1" state is applied along line 27 to the flip-flop 29 to change its state from a "0" state to a "1" state. The diode 42 is now biased into a non-conducting state and diode 39 is biased into a conducting state by having its anode connected to a positive voltage on the "0" side of flip-flop 29. The trigger circuits 26 and 31 automatically reset to await further input signals as described above. The cycle of operation for a situation where the frequency of the signals applied to therminals 21 and 23 are equal but not in phase is effective to produce no output signal on either output terminal 40 or 43.

Assume that the input signals are in phase and have the same frequency. In this case, the flip-flops 22 and 24 are triggered into new states (i.e., "0" state) at the same time. Since the anode of diode 25 is at a positive potential with respect to the cathode which is connected to line 36 by resistor 34, the capacitor 38 cannot charge to the threshold voltage of trigger circuit 26. However, capacitor 32 can charge through resistor 30, as described above, to the threshold voltage of trigger circuit 31. When this state is reached by capacitor 32, trigger circuit 31 changes its state and produces a reset signal for flip-flop 22. Flip-flop 22 is then reset to a "1" state which is effective to bias diode 25 into a non-conducting state and allow capacitor 38 to charge through resistor 34. When the threshold voltage of trigger circuit 26 is reached, flip-flop 24 is reset to a "1" state. Since flip-flop 24 must wait until flip-flop 22 is reset, the effect on flip-flop 29 is the same as previously described for out-of-phase input signals of the same frequency and the comparator circuit does not produce any output signal.

Assume that the frequency of the input signal on input terminal 21 is greater than the frequency of the input signal on input terminal 23. The two initial signals on terminals 21 and 23 have the same effect as the two signals discussed above for the out-of-phase, similar frequency input signals. Thus, flips-flops 22, 24 and 29 are passed through the same change of state cycle. This leaves diode 39 in a conductively biased state. However, the next signal is another signal on terminal 21. This signal is effective to change the state of flip-flop 22. This change is applied through diode 39 to appear across resistor 44 as an output signal on terminal 40. Flip-flop 22 is then reset by trigger circuit 31. Any additional signals on input terminal 21 which occur before another input signal on terminal 23 have a similar effect and appear at output terminal 40.

When an input signal on terminal 23 finally arrives, the cycle of operatin for the out-of-phase signals is repeated with the change of state of flip-flop 29. Thus, the next input signal on terminal 21 is used to reset flip-flop 29 to bias diode 39 back into a conducting state and this input signal does not appear on terminal 40. Accordingly, the frequency of the signal appearing on output terminal 40 is the difference in the frequencies of the two applied input signals.

Assume the frequency of the signals applied to input terminal 23 is greater than the frequency of the signal applied to input terminal 21. Here, again, the cycle of operation with the flip-flops 21 and 23 is repeated except that flip-flop 29 is now still in a "0" state so that diode 42 is biased into a conducting state. Thus, if any further input signals arrive on terminal 23, they each change the state of flip-flop 24, and this change of state appears across resistor 46 as an output signal on output terminal 43 representative of the direction of the input frequency relationship. The arrival of a signal on input terminal 21 is effective to start a new cycle so that the next signal on input terminal 23 is lost in resetting flip-flop 29 and unblocking diode 42. Accordingly, the output frequency on terminal 43 is, again, the difference between the frequencies of the applied input signals.

Thus, it may be seen that there has been provided, in accordance with the present invention, a digital control system for a process for controlling process deviations in either direction from a set-point while allowing changes in the set-point value and having a novel comparator for comparing digital signals to provide an error signal representative of a set-point deviation of the controlled process.

What is claimed is:

1. A digital control system comprising a digital comparator arranged to compare two digital input signals and to produce a digital output signal representative of the difference between said compared input signals and characterized by the relative direction of said difference, control means responsive to said output signal and operative to produce a control action having a rate and direction determined by said output signal, transducer means operative to produce a digital signal representative of the effect of said control action from said control means, means connecting said last mentioned digital signal to said comparator as one input signal to be compared, digital signal converter means responsive to said digital output signal from said comparator and operative to produce a digital reference signal having a frequency derived from the direction and magnitude of said difference signal, and means connecting said reference signal to said comparator means as a second input signal.

2. A digital control system as set forth in claim 1, wherein said converter means includes a reference voltage-signal source, a first digital to voltage converter means responsive to said digital output signal when characterized by a first direction of said difference between said compared input signals and operative to produce a voltage output signal corresponding to the sensed magnitude of said digital output signal and having a polarity opposite to that of an output signal from said reference source, a second digital to voltage converter means responsive to said digital output signal when characterized by a second direction of said difference between said compared input signals and operative to produce a voltage output signal corresponding to the sensed magnitude of said digital output signal and having a similar polarity to that of a signal from said reference source, circuit means connected to said output signal from said reference source, said first converter means, and said second converter means to produce an output signal representative of the algebraic summation thereof, and voltage to frequency converter means connected to said output signal from said last-mentioned circuit means and operative to produce said digital reference signal.

3. A digital control system as set forth in claim 1 wherein said digital comparator includes a first input terminal connected to said transducer means, a first flip-flop having a first state and a second state and having a first state-setting input circuit connected to said first input terminal, means responsive to said first state of said flip-flop to reset said flip-flop to said second state after a predetermined time interval, a second input terminal connected to said digital converter means to receive said reference signal, a second flip-flop having a first state and a second state and having a first state-setting input circuit connected to said second input terminal, means responsive to said first state of said second flip-flop to reset said second flip-flop to said second state after a predetermined time interval, said last mentioned means including means connected to said second state of said first flip-flop and operative to prevent a reset of said second flip-flop until said first flip-flop is in said first state, a third flip-flop having a first state and a second state, means connecting an output signal from said first state of said first flip-flop to set said third flip-flop in said first state, means connecting an output signal from said first state of said second flip-flop to set said third flip-flop in said second state, and output circuit means connected to said first states of said first and second flip-flops and arranged to be selectively biased by the states of said third flip-flop to pass a signal from said first flip-flop when said third flip-flop is in a second state and to pass a signal from said second flip-flop when said third flip-flop is in a first state, said output circuit means conencted to said control means.

4. A digital flow control system comprising a digital comparator arranged to compare two digital input signals to produce a pair of mutually exclusive output signals representing respective relative magnitudes of the frequency of said input signal and having a frequency corresponding to the frequency difference between said input signals, control means responsive to both of said output signals to produce a pair of respective control signals, flow control means responsive to said control signals to produce a first control action in response to one of said control signals and a second control action opposite to said first action in response to the other of said control signals, trandsucer means responsive to a flow representing variable and operative to produce a digital output signal, means connecting said last-mentioned signal as one input signal to said comparative means, digital signal converter means responsive to both of said output signals from said comparator and operative to produce a digital reference signal having a frequency derived from the frequency and the relative identity of said output signals from said comparator and circuit means arranged to connect said reference signal as the other input signal to said comparator.

References Cited

UNITED STATES PATENTS

| | | | |
|---|---|---|---|
| 2,985,773 | 5/1961 | Dobbie | 324—79 XR |
| 3,034,028 | 5/1962 | Jamieson | 318—28 |
| 3,084,307 | 4/1963 | Landis | 324—79 XR |
| 3,308,398 | 3/1967 | Chilton | 324—79 |

MARTIN P. HARTMAN, *Primary Examiner.*

U.S. Cl. X.R.

318—18; 340—347; 324—79